C. F. JENKINS.
MOTION PICTURE FRAMING.
APPLICATION FILED OCT. 5, 1918.

1,348,566.

Patented Aug. 3, 1920.

Witness
Edwin L. Bradford

Inventor
Charles Francis Jenkins,
By
Attorneys

UNITED STATES PATENT OFFICE.

CHARLES FRANCIS JENKINS, OF WASHINGTON, DISTRICT OF COLUMBIA.

MOTION-PICTURE FRAMING.

1,348,566.          Specification of Letters Patent.      Patented Aug. 3, 1920.

Application filed October 5, 1918. Serial No. 257,079.

*To all whom it may concern:*

Be it known that I, CHARLES FRANCIS JENKINS, a citizen of the United States, and resident of Washington, in the District of Columbia, have invented certain new and useful Improvements in Motion-Picture Framing, of which the following is a specification, reference being had therein to the accompanying drawing.

In motion picture exhibiting, the pictures are carried in proper lateral adjustment, with respect to the exposure opening, by the sprocket drums commonly employed, but "framing" adjustment is needed with each fresh film and frequently at other times, *e. g.* when the film has been inaccurately spliced, and such adjustment is made by moving a framing member longitudinally of the film strip. If any picture is not properly framed, usually all that follow are affected in like manner, until the attention of the operator is called to the difficulty and the framing member is properly moved. Since the need of such adjustment may arise at any instant, the attendant should be watchful every moment. The object of this invention is to secure immediate correction of any inaccurate framing, either by an automatic signal alone or by following the signal by automatic adjustment of the framing member, in case the attendant for any reason does not act immediately when the difficulty arises.

The automatic devices are actuated by making small portions of the film near each picture opaque and so locating a selenium cell that during periods of the film's rest the corresponding opaque area prevents light from passing to the cell provided that the picture is properly framed, but not otherwise. As the pictures are fed at the rate of sixteen a second and as the period of rest is commonly three times as long as the period of motion, the light falling upon the cell during the movements is not great enough to actuate the cell, while the light falling upon the cell during both periods will so increase conductivity that a working current is thereby set up in a battery signal circuit. Such signal calls the attention of the operator, and the framing member and the cell are so adjusted that the cell is protected by the opaque areas. I so arrange this signal circuit that it will close another circuit which adjusts the framing member and cell automatically.

In the accompanying drawings.

Figure 1:
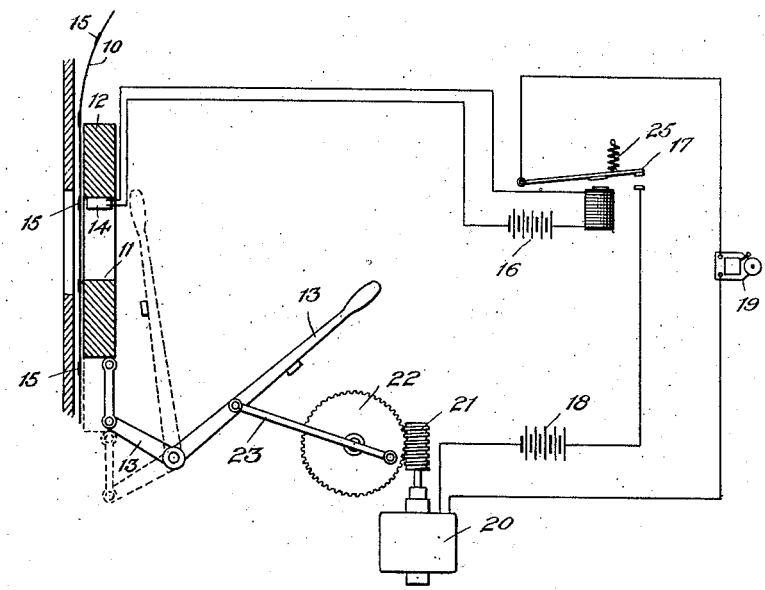
Figure 1 shows my devices in connection with ordinary film handling devices.
Figure 2:
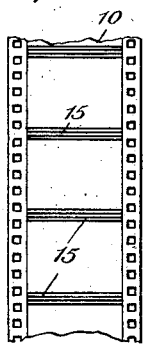
Fig. 2 shows one face of a portion of the film which may be used as an embodiment of one feature of the invention.
Figure 3:
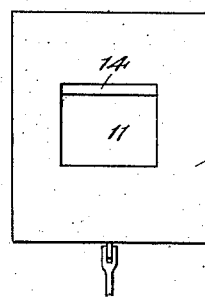
Fig. 3 shows one of the broader faces of a framing member.
Figure 4:
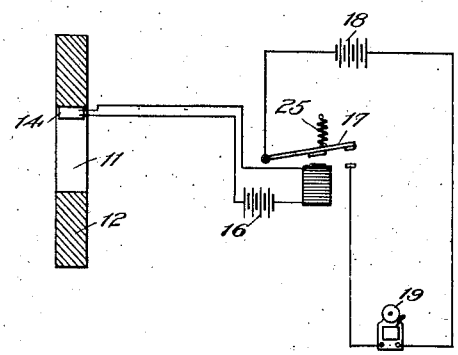
Fig. 4 shows the circuits with the motor devices omitted, the signal being operated as before.

In these figures, 10 indicates a motion picture film such as is usually fed step past the opening 11 in a framing member 12 vertically adjusted by a hand lever 13.

In and near one of the horizontal sides of the opening 11 is secured a narrow selenium cell 14 which extends across the path of the film at right angles to its margins. In each interval between the pictures the film has a transverse opaque band 15 slightly wider than the cell and in position to cover the latter and prevent any part of the projecting light from reaching it during the film's rest periods, provided that the pictures are properly framed. If at any time it happens that the cell and framing member are not so adjusted that the opaque bands protect the former from the light beam during periods of rest, light will fall upon the cell continuously, increasing its conductivity and thus causing current to flow in a cell-including circuit of a battery 16. The current so set up energizes the coil of a circuit maker 17, closing the circuit of a battery 18 in which is included a signal 19 for calling the attention of the operator to the fault in framing so that he may manually correct it. In order that the error may be corrected if for any reason the operator does not act promptly, I sometimes place in the signal circuit a small motor 20 having on its shaft a worm 21 which rotates a worm gear 22 carrying a pitman 23 connected to the usual framing lever 13 which vertically adjusts the framing member through a distance, if necessary, equal to the width of a picture space, and the eccentricity of the crank pin is such that a half rotation swings the lever in one direction through its full angular movement. Were the motor to run continuously, the framing member would thus be carried slowly back and forth in a path equal to the height of a picture space. Practically, however, it moves until the cell is in position to be protected from the projecting beam by the opaque areas of the film as it may be running after a splicing point, for example, has been passed. When this occurs, the current through the cell ceases to hold the signal or signal and motor, circuit closed and a light spring breaks it in the usual way. Thereafter, the film runs on, properly framed, until for some reason, e. g. another splicing point being reached, the devices are again automatically brought into action.

What I claim is:

1. The combination with a picture framing member of picture projecting apparatus, of devices responsive to variations of intensity of light and of signal devices controlled by said light responsive devices.

2. The combination with the framing member of a picture projecting machine, of a motor arranged for adjusting said member, and means whereby maladjustment of said member causes corrective action of the motor.

3. The combination with the framing member of a picture projecting machine, of a signal device, a motor for adjusting said member, and means whereby maladjustment of said member actuates the signal device and causes corrective action of the motor.

4. The combination with the framing member of a picture projecting machine, of a picture film having an opaque area corresponding to each of its pictures, a framing member carrying a selenium cell in position to be protected from the light beam only when each picture is properly framed, a signal device and a motor, a source of electric energy and a circuit including said source, cell, signal and motor, and means whereby the motor when actuated adjusts the framing member and prevents light from passing to said cell.

5. The combination with the framing member of a motion picture machine, of a picture film having opaque areas corresponding to its pictures, a selenium cell carried by said member in position to be protected from the light beam by said opaque areas only when the framing member is properly adjusted, a signal device, and a battery making circuit through the signal device and completed through said cell when the beam falls upon the latter.

6. The combination with a picture framing member of a picture projecting apparatus, of light actuated signal devices in position to be actuated by light rays entering the opening of said member near the margin and means for varying the intensity of such rays while the pictures are improperly framed.

In testimony whereof I hereunto affix my signature.

CHARLES FRANCIS JENKINS.